(12) United States Patent
Bernstein et al.

(10) Patent No.: US 8,924,797 B2
(45) Date of Patent: Dec. 30, 2014

(54) IDENTIFYING A DIMENSION ASSOCIATED WITH AN ABNORMAL CONDITION

(75) Inventors: Ruth Bernstein, Kiryat Ono (IL); Ira Cohen, Modiin (IL)

(73) Assignee: Hewlett-Packard Developmet Company, L.P., Houston, TX (US)

( * ) Notice: Subject to any disclaimer, the term of this patent is extended or adjusted under 35 U.S.C. 154(b) by 278 days.

(21) Appl. No.: 13/447,512

(22) Filed: Apr. 16, 2012

(65) Prior Publication Data
US 2013/0275816 A1 Oct. 17, 2013

(51) Int. Cl.
*G06F 11/00* (2006.01)
(52) U.S. Cl.
USPC .......... 714/47.2; 714/25; 714/37; 714/47.1; 714/47.3
(58) Field of Classification Search
CPC ........... G06F 11/0751; G06F 11/0754; G06F 11/076; G06F 11/30; G06F 11/3006; G06F 11/3017; G06F 11/3048; G06F 11/3055; G06F 11/34; G06F 11/3452
USPC ............. 714/25, 26, 37, 38.1, 39, 47.1, 47.2, 714/47.3
See application file for complete search history.

(56) References Cited

U.S. PATENT DOCUMENTS

| | | | |
|---|---|---|---|
| 7,788,634 B2 | 8/2010 | Acott | |
| 7,877,642 B2 | 1/2011 | Ding | |
| 7,996,374 B1 | 8/2011 | Jones | |
| 2003/0079160 A1* | 4/2003 | McGee et al. | 714/39 |
| 2006/0020924 A1 | 1/2006 | Lo | |
| 2008/0016412 A1* | 1/2008 | White et al. | 714/48 |
| 2010/0083054 A1* | 4/2010 | Marvasti | 714/47 |
| 2011/0087924 A1* | 4/2011 | Kandula et al. | 714/26 |
| 2011/0119100 A1 | 5/2011 | Ruhl | |
| 2012/0079098 A1* | 3/2012 | Moehler et al. | 709/224 |

* cited by examiner

*Primary Examiner* — Joseph D Manoskey
(74) *Attorney, Agent, or Firm* — Trop, Pruner & Hu, P.C.; Dan C. Hu (57) ABSTRACT

At least one value of abnormal metrics is identified as being an abnormal dimension value. A dominant dimension related to the anomaly is identified based on the identified abnormal dimension value.

21 Claims, 7 Drawing Sheets

IDENTIFYING A DIMENSION ASSOCIATED WITH AN ABNORMAL CONDITION

BACKGROUND

A system of devices can include one or multiple monitors that are able to make measurements in the system. Examples of measurements include measurements of metrics such as processor utilization, data throughput, transaction time, and so forth. An anomaly occurring in the system can cause the value of a metric to deviate from an expected value.

BRIEF DESCRIPTION OF THE DRAWINGS

Some embodiments are described with respect to the following figures.

DETAILED DESCRIPTION

When an anomaly in a system causes metric measurements to deviate from baseline values, it may be desirable to identify the cause of the anomaly. An anomaly can refer to an abnormal condition occurring in the system, which can be caused by various factors. A "baseline value" of a metric refers to an expected value of the metric during an operation of the system, where the expected value can be derived from historical measurements, from knowledge of an expert, or from another source.

A "system" can refer to a system that includes computers, storage devices, communication devices, and so forth. In some examples, a system can be an information technology (IT) system or other type of system. In a relatively large system, it can be relatively difficult to ascertain a cause of an anomaly in the system, based on metric measurements that have deviated from baseline values.

As an example, consider a metric that measures a time involved in performing a transaction, such as a login transaction (a transaction in which a user logs into a system). Normally, it can be expected that a login transaction has a transaction time that falls within some predefined range (range of baseline values). For example, the range can be expressed as being less than or equal to some predefined time value. A login transaction time that exceeds the predefined time value can be an indication that some anomaly has occurred in the system. For example, the anomaly can be caused by equipment failure at a particular location in the system (e.g. switch failure in a network or server hardware failure). As another example, the anomaly may be caused by a faulty application in a server. As a further example, the anomaly may be caused by excessive loading, such as excessive loading at a switch or server.

In a relatively large system, there can be a relatively large number of users that perform login transactions on any given day. Some of the login transactions may encounter the anomaly in the system, while other login transactions may not experience the anomaly. It is desirable to identify a root cause of the anomaly, but such identification can be relatively difficult in a large or complex system.

A metric, such as the transaction time metric noted above, may be associated with multiple dimensions. Multiple metrics can share the multiple dimensions. As an example, the multiple dimensions can include a transaction dimension, a location dimension, and a server dimension. The transaction dimension can indicate a type of transaction (e.g. login transaction, logout transaction, add-to-cart transaction, etc.), the location dimension can identify a particular location at which a client device that issued the transaction is located at (e.g. a city, state, or other location identifier), and the server dimension can identify a specific server that is associated with the transaction. More generally, each dimension associated with a metric can be associated with multiple dimension values. For example, the transaction dimension can have the following values: "login," "logout," etc. The location dimension can have the following dimension values: "Tel Aviv," "Jerusalem," etc. The server dimension can have the following example values: "MyServer," "ServerX," etc.

In accordance with some implementations, dimension values associated with received metrics that indicate an anomaly can be used to determine a cause of the anomaly. A metric indicating an anomaly refers to a metric whose value (e.g. transaction time value) deviates from a baseline value. Such a metric can be referred to as an "abnormal metric" in the ensuing discussion.

The dimension values of dimensions associated with abnormal metrics can be analyzed to determine which of the dimension values is (are) abnormal dimension value(s). An "abnormal dimension value" refers to a dimension value that has some correlation with an anomaly. As a result, an abnormal dimension value can be used for the purpose of identifying a cause of the anomaly.

Figure 1:
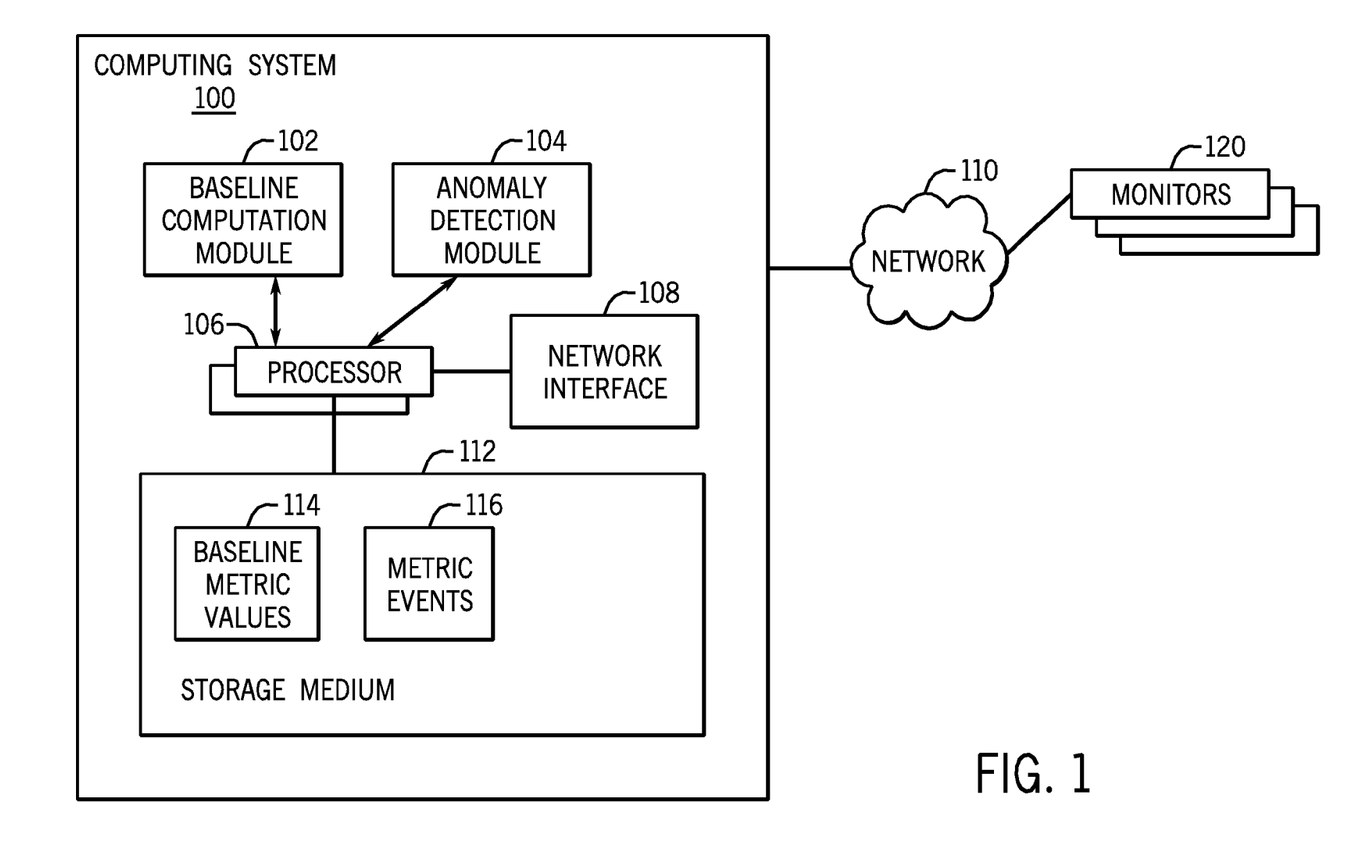
FIG. 1 is a block diagram of an example arrangement including a computing system that has an anomaly detection module according to some implementations.

FIG. 1 is a block diagram of an example computing system 100 that includes a baseline computation module 102 and an anomaly detection module 104. In some examples, the baseline computation module 102 and anomaly detection module 104 can be implemented with machine-readable instructions that are executable on one or multiple processors 106. The processor(s) 106 can be implemented in one computer or distributed across multiple computers. The processor(s) 106 can be connected to a network interface 108 to allow the system 100 to communicate over a network 110. The computing system 100 can also include a storage medium (or storage media) 112 to store various information.

The baseline computation module 102 can compute baseline metric values for various metrics. For example, the baseline computation module 102 can analyze measurements of metrics made during operation of a system of devices. The operation can include normal operation of the system, a test (or training) operation of the system, and so forth. Based on the analysis of the metric measurements during the operation of the system, the baseline computation module 102 is able to compute a baseline metric value for each analyzed metric, such as by averaging or computing some other aggregate of the measured metric values. In other examples, the baseline computation module 102 can compute baseline metric values in response to other information, such as information from an expert or experts, or information from another source.

The baseline metric values are stored as 114 in the storage medium 112. As noted above, a baseline metric value (or range of baseline metric values) can be compared to a received metric to determine whether the received metric is an abnormal metric (in other words, the received metric has deviated from the baseline metric value(s).

The storage medium (or storage media) 112 can also store metric events 116, which can include events received over the network from monitors 120 in a system. The monitors 120 can monitor various types of metrics, such as processor or server utilization, storage utilization, data throughput, transaction time, or other metrics. The monitors 120 can be implemented with hardware monitoring devices and/or machine-readable instructions.

The metric events 116 can include abnormal metrics. Note that the metric events 116 can also include non-abnormal metrics (those metrics that have not deviated from corresponding baseline metric values). Abnormal metrics can be analyzed by the anomaly detection module 104, which is able to identify abnormal dimension value(s) and a dominant dimension associated with the abnormal metrics (explained further below), which can be used to determine a cause of a related anomaly.

Figure 2:
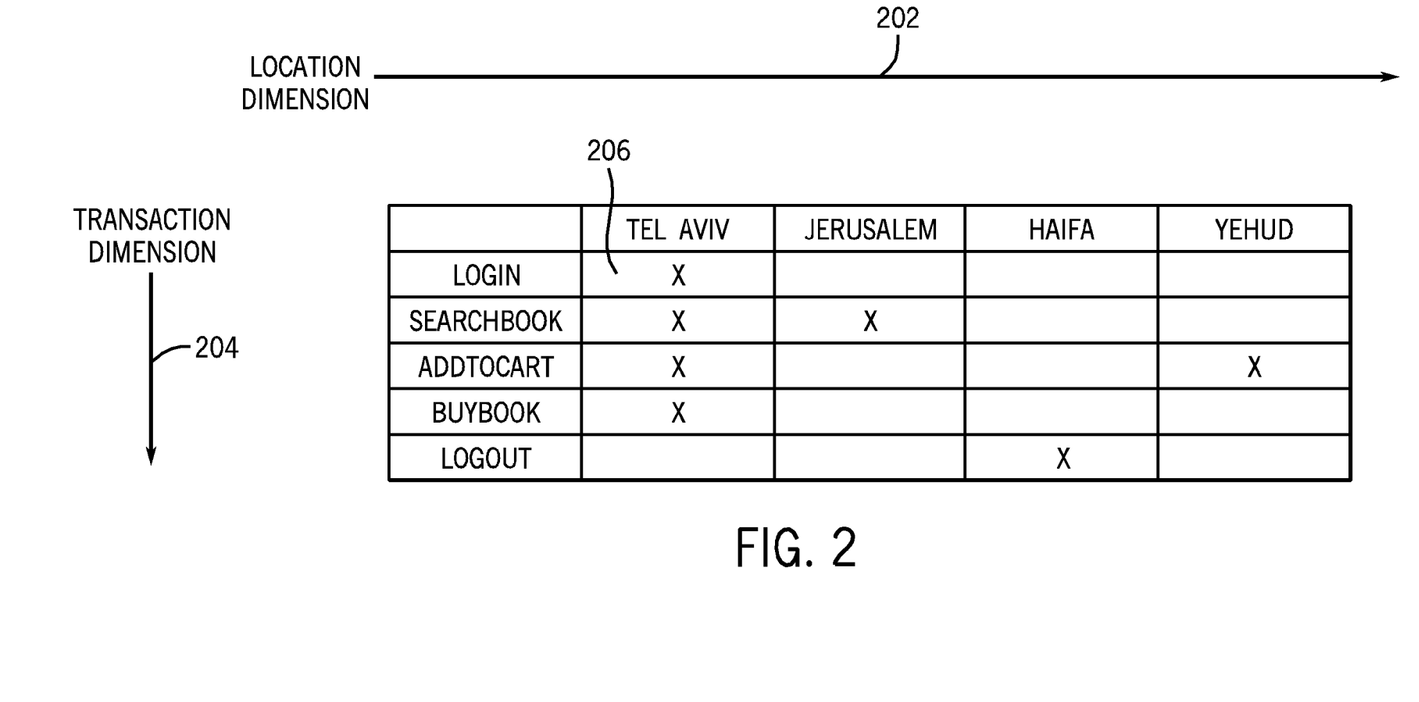
FIG. 2 illustrates an example matrix having content based on abnormal metrics that are to be processed according to some implementations.

FIG. 2 shows an example matrix that has two dimensions: a location dimension 202 and a transaction dimension 204. These are dimensions associated with received metrics, including abnormal metrics (in the metric events 116 of FIG. 1, for example). The content of the matrix of FIG. 2 is based on received abnormal metrics. If there are more than two dimensions to be represented, then the matrix can have more than two dimensions.

The location dimension 202, which can identify a location of a client device that initiated the corresponding transaction, for example, can have the following example dimension values: Tel Aviv, Jerusalem, Haifa, and Yehud. The transaction dimension 204, which can identify a type of transaction, can have the following example values: LoginSearchBook, AddToCart, BuyBook, and Logout.

A given abnormal metric that is associated with a corresponding pair of a particular location dimension value and a particular transaction dimension value is indicated with an "X" in the matrix of FIG. 2. Thus, for example, the given abnormal metric that is associated with location Tel Aviv and that performed a Login transaction has an "X" marked in box 206 of the matrix.

The matrix of FIG. 2 is used to illustrate that Tel Aviv is likely an abnormal location dimension value, since there are multiple abnormal metrics associated with the Tel Aviv location dimension value that have different transaction dimension values in the matrix of FIG. 2. Note that there are more abnormal metrics containing the Tel Aviv location dimension value than other location dimension values (e.g. Jerusalem, Haifa, and Yehud). Note also that there are more abnormal metrics that share the Tel Aviv location dimension value than share transaction dimension values (e.g. in the matrix of FIG. 2, there are four abnormal metrics that share the Tel Aviv location dimension value, but just two abnormal metrics that share the SearchBook or AddToCart transaction dimension value).

Consequently, it is likely that, based on the example matrix of FIG. 2, an abnormal dimension value is Tel Aviv, while the dominant dimension is the location dimension 202. A "dominant dimension" refers to a dimension of a metric that is most closely correlated or associated with an anomaly that gave rise to an abnormal metric. Once the abnormal dimension value (or abnormal dimension values) and dominant dimension are ascertained, a cause of the corresponding anomaly that gave rise to the abnormal metrics can be determined. In the context of the example matrix of FIG. 2, the cause of the anomaly is likely due to a location of the requesting client devices, and the specific location is likely Tel Aviv.

By identifying abnormal dimension value(s) according to some implementations, it is possible to filter out abnormal metrics that are momentary in nature (caused by a temporary fluctuation, for example). Such momentary abnormal metrics are considered "noise" abnormal metrics, which tend to occur at random. Since the occurrence of noise abnormal metrics are random, such noise abnormal metrics would be less likely to share dimension values with other abnormal metrics.

In the example of FIG. 2, the metrics "SearchBook from Jerusalem," "Logout from Haifa," "AddToCart from Yehud" are examples of noise metrics.

Figure 3:
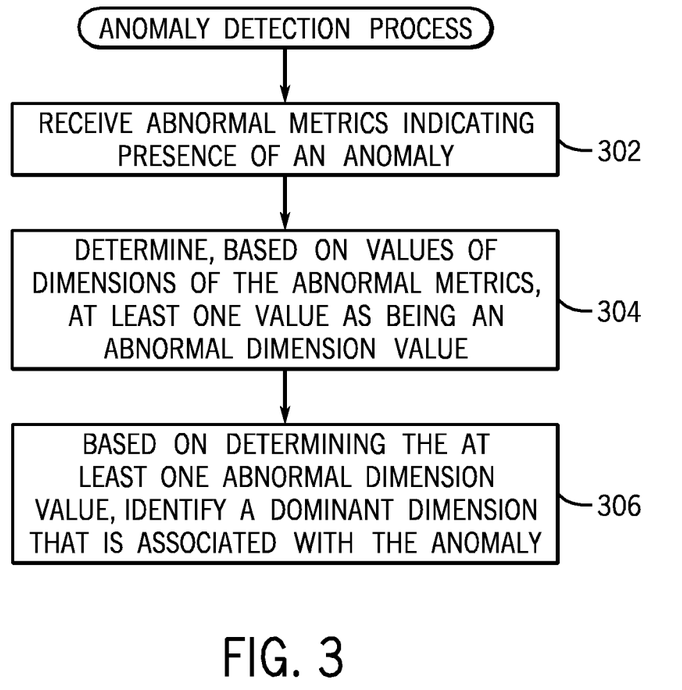
FIG. 3 is a flow diagram of an anomaly detection process, in accordance with some implementations.

FIG. 3 is a flow diagram of an anomaly detection process according to some implementations. The process of FIG. 3 can be performed by the anomaly detection module 104 of FIG. 1, in some examples. The process receives (at 302) abnormal metrics indicating presence of an anomaly. As noted above, such abnormal metrics can be associated with a common set of dimensions. The process determines (at 204), based on values of the dimensions of the abnormal metrics, at least one of the dimension values as being an abnormal dimension value. Such an abnormal dimension value is a dimension value that has some correlation with the anomaly. In the matrix of FIG. 2, for example, the Tel Aviv location dimension value can be determined to be the abnormal dimension value, since there is a high likelihood that the anomaly has some relation to the Tel Aviv location.

Based on determining the at least one abnormal dimension value, the process identifies (at 306) a dominant dimension that is associated with the anomaly. In the example of FIG. 2, since the Tel Aviv location dimension value is identified as the abnormal dimension value, then the dominant dimension can be identified as being the location dimension. The dominant dimension can be considered the "problematic" dimension, and can be an indication to an analyst that a geographic location can be the cause of anomalies in the system.

In some cases, there is just one dominant dimension identified in the anomaly detection process, since all of the detected abnormal dimension values are of the same dimension. However, in other cases, if there are abnormal dimension values of different dimensions, then the dominant dimension identified at 306 can be chosen to be the dimension with the most number of dimension values. Alternatively, the anomaly detection process can present the different candidate dimensions to an analyst, who can then investigate the issue for the purpose of identifying a dominant dimension.

Figure 4:
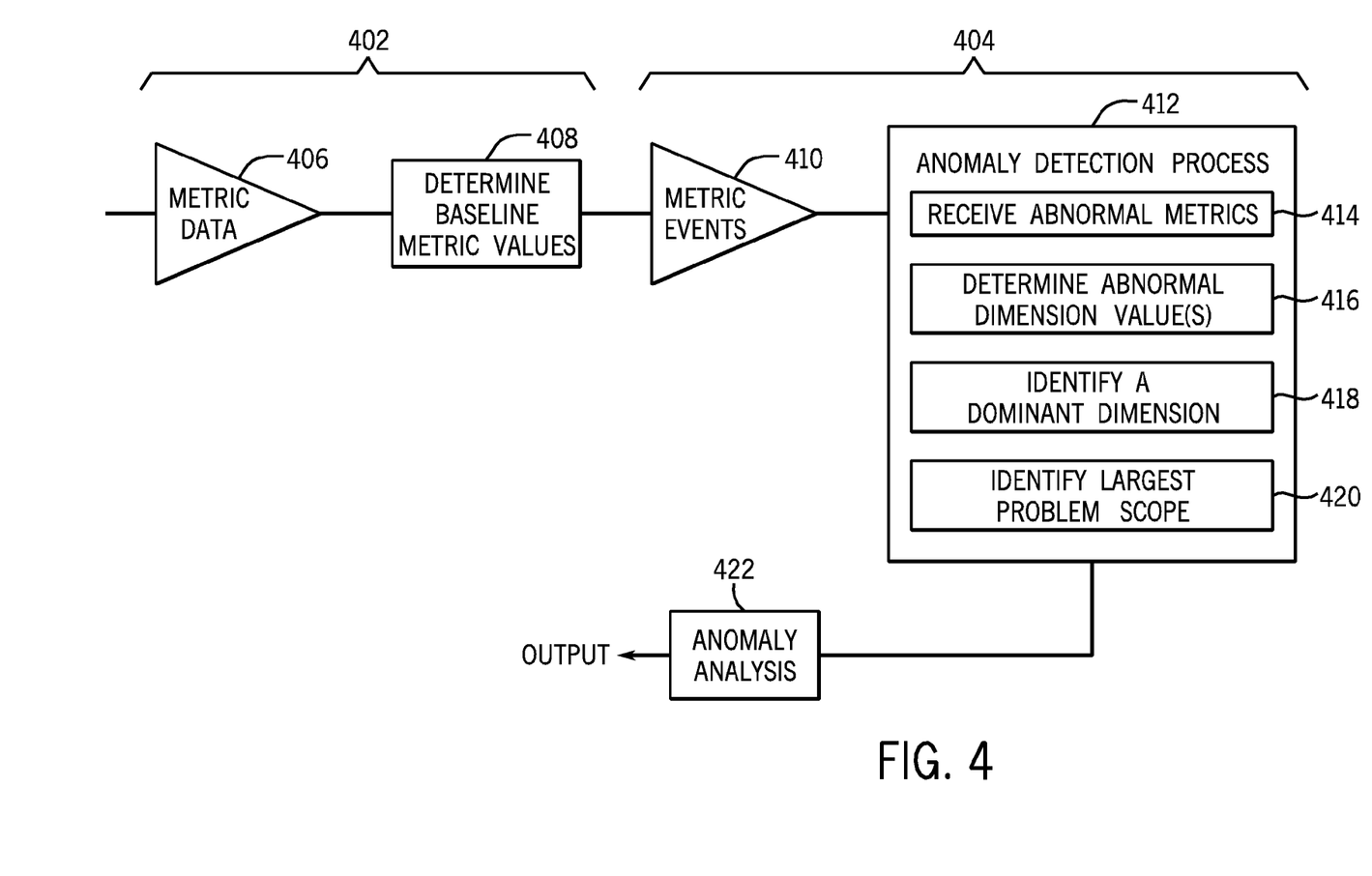
FIG. 4 is a flow diagram of a process according to further implementations.

FIG. 4 is a flow diagram of a process according to further implementations. The various tasks depicted in FIG. 4 can include a first set 402 of tasks (including tasks 406 and 408) that is performed by the baseline computation module 102 of FIG. 1, and another set 404 of tasks (including tasks 410 and 412) performed by the anomaly detection module 104 of FIG. 1.

The baseline computation module 102 receives (at 406) metric data, and based on the received metric data, the baseline computation module 102 determines (at 408) baseline metric values. The received metric data can include metrics received during an operation of the system, which can be a normal operation of the system, a test or training operation of the system, and so forth.

The anomaly detection module 104 receives metric events (at 410). Based on the metric events, the anomaly detection module 104 performs an anomaly detection process 412, which includes receiving abnormal metrics (at 414), determining (at 416) abnormal dimension value(s), and identifying a dominant dimension (at 418). The tasks 414, 416, and 418 are similar to the tasks 302, 304, and 306, respectively, of FIG. 3.

In FIG. 4, the anomaly detection process 412 further identifies (at 420) a largest problem scope. A "largest problem scope" refers to a dimension value that covers a group of abnormal dimension values determined at 416. For example, if the abnormal dimension values determined at 416 include Tel Aviv and Jerusalem, then the largest problem scope in such an example can include an Israel dimension value, since Israel covers both Tel Aviv and Jerusalem (which are cities in the country of Israel).

Outputs from the anomaly detection process 412 can be used in performing (at 422) an anomaly analysis, which is able to identify a cause of an anomaly corresponding to the abnormal dimension value(s) and dominant dimension determined in the anomaly detection process 412. As an example, assume that the dominant dimension identified at 418 is the location dimension, and the largest problem scope identified at 420 is the Israel dimension value, then the anomaly analysis task (422) can determine that the cause of the anomaly are locations in Israel.

The anomaly analysis task 422 provides an output, which can be provided to a device (e.g. computer or personal digital assistant) for review by an analyst, for example.

Figure 5:
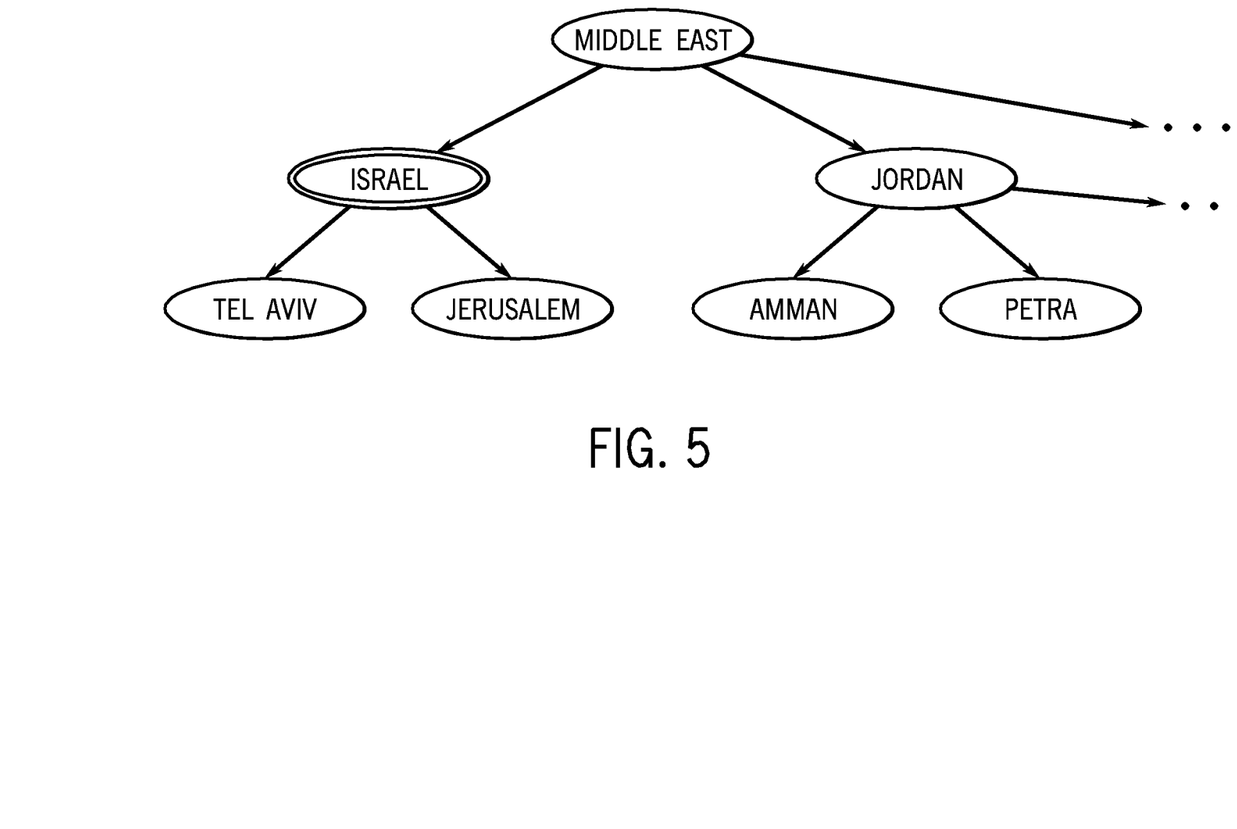
FIG. 5 illustrates an example hierarchical tree including nodes representing corresponding dimension values to be used in a process according to some implementations.

FIG. 5 is an example graph that illustrates hierarchical relationships among dimension values. The graph is in the form of a dimension tree that has nodes (or entities) that represent respective dimension values of the location dimension. The location dimension tree of FIG. 5 includes lowest-level nodes that represent respective cities, including Tel Aviv, Jerusalem, Amman, and Petra. The next level in the location dimension tree are nodes representing countries, including Israel and Jordan. The next higher level in the location dimension tree can represent a geographic region, such as the Middle East. There can be further levels in the location dimension tree in other examples.

The location dimension tree can be used for the purpose of identifying the largest problem scope (at 420 in FIG. 4). As noted above, in one example, the abnormal dimension values determined (at 416) can include Tel Aviv and Jerusalem. Using the location dimension tree of FIG. 5, the largest problem scope can be identified as being the Israel dimension value, since the Tel Aviv and Jerusalem dimension values are represented by nodes that are children of the node representing Israel. Stated differently, in identifying the largest problem scope, nodes representing abnormal dimension values (e.g. Tel Aviv and Jerusalem) in the location dimension tree are identified. The parent node of these identified nodes can then be marked as representing the largest problem scope if a predefined condition is satisfied (e.g., the number of children nodes depending from the parent node that have been marked as representing abnormal dimension values satisfies the predefined condition).

The following discusses further details relating to determining whether a dimension value is an abnormal dimension value (as performed at 304 in FIG. 3 or 416 in FIG. 4). For determining whether a dimension value x is abnormal, a count of the number of occurrences of the dimension value x in received abnormal metrics can be compared to a total metric count for the dimension value x, where the total metric count represents the total number of metrics that contain the dimension value x. Note that the total number of metrics can include both abnormal metrics and non-abnormal metrics.

In some examples, the comparison noted above is performed using the following formula:

$$\frac{AbnormalCount(x)}{TotalMetricCount(x)} \geq Threshold,$$

where AbnormalCount(x) represents the number of occurrences of the dimension value x in abnormal metrics, TotalMetricCount(x) represents a total number of occurrences of the dimension value x in both abnormal and non-abnormal metrics, and Threshold represents a predefined threshold (e.g. 0.8 or other value). If the evaluation according to the formula above evaluates to true, then that is an indication that the dimension value x is an abnormal dimension value.

In the foregoing example, it is assumed that the parameter Threshold is a static threshold. In other examples, the parameter Threshold can be a dynamic threshold, which can be learned based on metric data acquired during operation of the system (normal operation of the system or a test or training operation of the system). Multiple thresholds can be learned for multiple dimension values (note that the thresholds can be different across multiple dimension values). A statistical baseline technique can be used to learn the normal behavior of a dimension value over time, and the parameter Threshold can be determined based on the normal behavior of the dimension value over time.

Figure 6A:
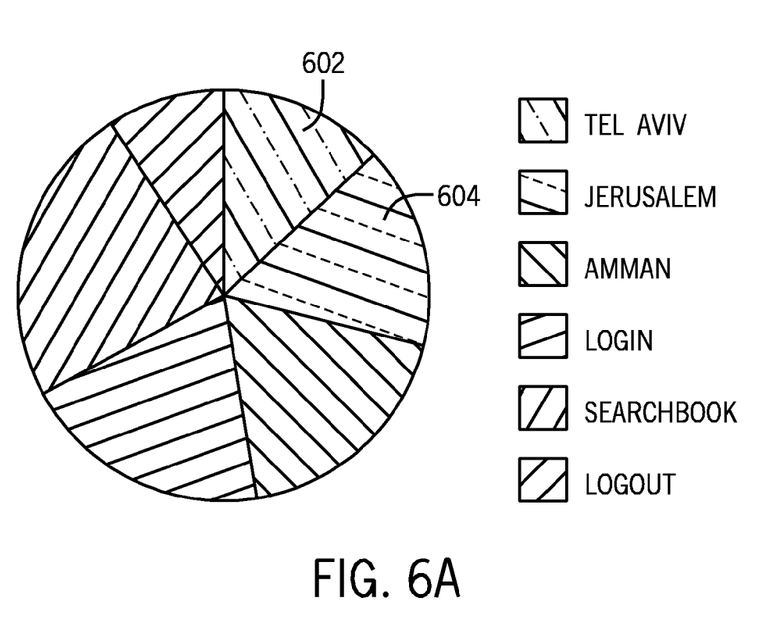
FIGS. 6A-6B are graphs of relative proportions of dimension values to be used in a process according to some implementations.

In other examples, instead of using a threshold (whether statically or dynamically set) for identifying abnormal dimension values, the abnormal counts AbnormalCount(x1, . . . , xn) of dimension values x1 to xn, where n≥1, can be compared. The abnormal counts of different dimension values can be determined over time, such as during normal operation of a system or during a training test or test operation of the system. FIG. 6A shows a "normal proportion" of abnormal counts among different dimension values, including Tel Aviv, Jerusalem, Amman, Login, SearchBook, and Logout. This "normal proportion" of abnormal counts is learned during a predefined operation of the system, as noted above.

At a later point in time, after the normal proportion of abnormal counts has been learned, if the proportion of an abnormal count of a particular dimension value varies by some predefined amount (e.g. some predefined percentage) from its normal proportion, then the particular dimension value can be identified as an abnormal dimension value (in task 304 of FIG. 3 or task 416 of FIG. 4). Note that there can be multiple dimension values that vary by some predefined amount from their respective normal proportions, in which case these multiple dimension values are identified as abnormal dimension values.

FIG. 6A shows a normal proportion 602 (represented by a slice of the pie chart) of the abnormal count of the Tel Aviv dimension value, a normal proportion 604 (represented by another slice of the pie chart) of the abnormal count of the Jerusalem dimension value, and other normal proportions of other dimension values.

Figure 6B:
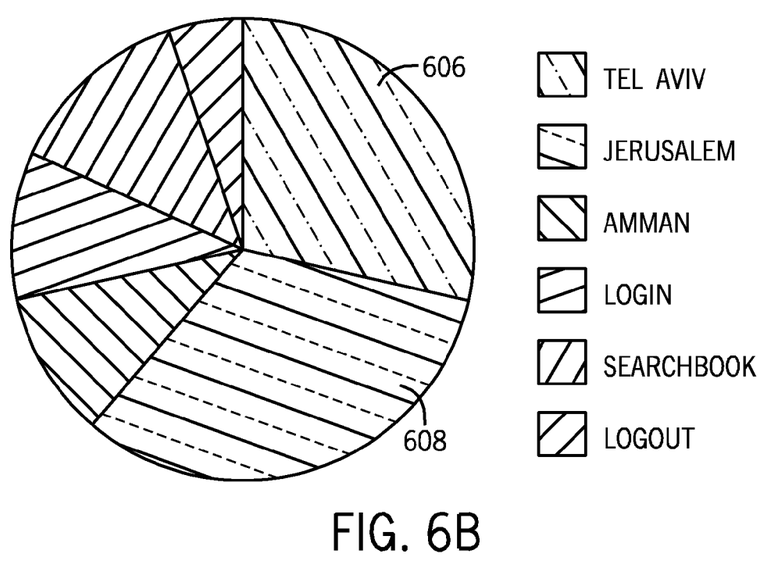

FIG. 6B shows that the proportions 606 and 608 of the abnormal counts for the Tel Aviv and Jerusalem dimension values, respectively, are larger than the respective normal proportions 602 and 604 in FIG. 6A. As a result, the Tel Aviv and Jerusalem dimension values can be identified as abnormal dimension values, since each of their proportions at the time represented by the pie chart of FIG. 6B is greater than their normal proportion by some predefined amount.

The following provides further details regarding the identification of the largest problem scope (task 420 in FIG. 4).

The identification of the largest problem scope uses a dimension tree, such as the location dimension tree of FIG. 5.

FIGS. 7A-7D show how a dimension tree can be used by a largest problem scope identification process. The largest problem scope identification process receives a dimension tree, such as a dimension tree represented in FIG. 7A. Note that an input to the largest problem scope identification process includes the abnormal dimension values determined at 416 in FIG. 4. The nodes corresponding to the abnormal dimension values are marked, as shown by the darkened nodes in FIG. 7B. Note that at this stage, the marked nodes are at the lowest level of the dimension tree of FIG. 7B.

Figure 7A:
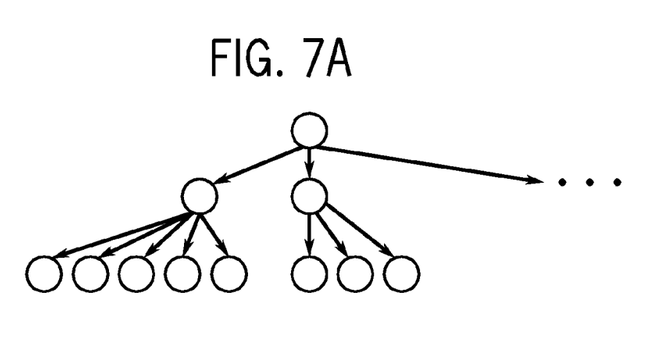
FIGS. 7A-7D illustrate example hierarchical trees to be used in a process according to some implementations.
Figure 7B:
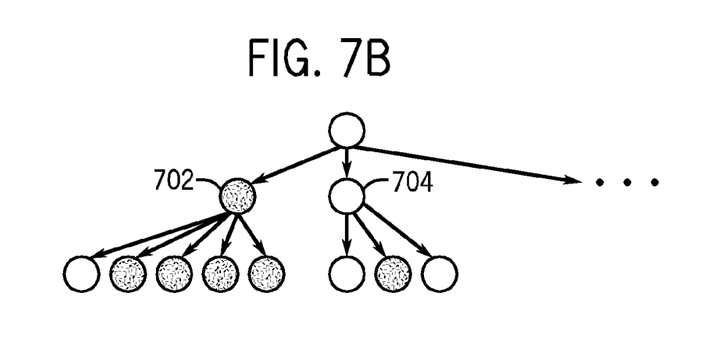
Figure 7C:
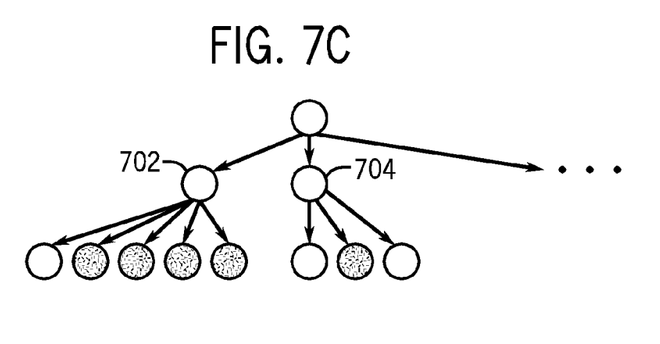

The process next propagates an abnormal status of the dimension tree according to a predefined rule. In some examples, an abnormal status of children nodes are propagated to a parent node if the following condition is satisfied:

$$\frac{NumberOfAbnormalChildren(y)}{NumberOfChildren(y)} \geq Threshold,$$

where NumberOfAbnormalChildren(y) represents a number of abnormal children nodes of node y, NumberOfChildren(y) represents a total number of children nodes of node y, and Threshold represents a predefined threshold. In the example of FIG. 7B, an intermediate node 702 has four abnormal children nodes (the darkened nodes under node 702), and five total children nodes. An intermediate node 704 has one abnormal child node, and three total children nodes. Since the condition above is satisfied for intermediate node 702, the intermediate node 702 is darkened in FIG. 7C. However, the condition above is not satisfied for the intermediate node 704, in which case the intermediate node 704 is not darkened in FIG. 7C.

Figure 7D:
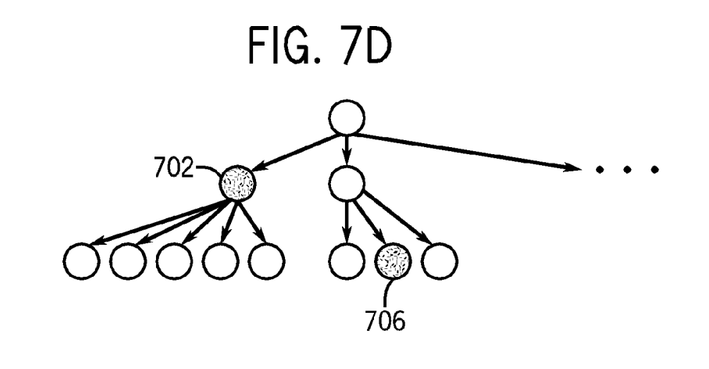

The largest problem scope identification process selects the highest abnormal node in the dimension tree that does not have an abnormal parent. In the example of FIG. 7D, the highest abnormal nodes are the nodes that are darkened, including the intermediate node 702 and a lowest level node 706.

Machine-readable instructions of modules described above (e.g. 102 and 104 of FIG. 1) are loaded for execution on a processor or processors (e.g. 106 in FIG. 1). A processor can include a microprocessor, microcontroller, processor module or subsystem, programmable integrated circuit, programmable gate array, or another control or computing device.

Data and instructions are stored in respective storage devices, which are implemented as one or more computer-readable or machine-readable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some or all of these details. Other implementations may include modifications and variations from the details discussed above. It is intended that the appended claims cover such modifications and variations.

What is claimed is:

1. A method comprising:
receiving abnormal metrics indicating presence of an anomaly in a system, wherein the abnormal metrics are associated with a plurality of dimensions;
determining, based on values of the plurality of dimensions, at least one of the values as being an abnormal dimension value; and
based on determining the at least one abnormal dimension value, identifying a dominant dimension that is associated with the anomaly, the dominant dimension being one of the plurality of dimensions.

2. The method of claim 1, wherein determining that the at least one value is an abnormal dimension value is based on determining an amount of occurrences of the at least one value in the received abnormal metrics.

3. The method of claim 2, wherein the at least one value is determined to be an abnormal dimension value in response to a ratio of the amount of occurrences of the at least one value in the received abnormal metrics to an amount of occurrences of the at least one value in overall received metrics exceeding a threshold.

4. The method of claim 3, wherein the threshold is one of a static threshold and a dynamically learned threshold.

5. The method of claim 2, wherein the at least one value is determined to be an abnormal dimension value in response to a proportion of the at least one value to other values of the dimension exceeding a computed proportion by greater than a predefined amount.

6. The method of claim 5, wherein the computed portion is based on relative amounts of the values of the dimensions learned during an operation of the system.

7. The method of claim 1, further comprising:
using the abnormal dimension value to determine whether the anomaly is associated with a first entity representing the abnormal dimension value, or is associated with a second entity that is at a higher hierarchical level than the first entity.

8. The method of claim 7, further comprising:
receiving a representation of dimension values of a particular dimension at a plurality of hierarchical levels, where the representation identifies dimension values that are children of other dimension values.

9. The method of claim 8, wherein determining that the anomaly is associated with the second entity is in response to determining that the second entity has a number of children abnormal dimension values that satisfies a predefined rule.

10. The method of claim 1, wherein the determining and the identifying are performed by at least one processor.

11. The method of claim 1, wherein the determining comprises determining a plurality of the values of the plurality of dimensions as abnormal dimension values, a first of the abnormal dimension values being a value of a first of the plurality of dimensions, and a second of the abnormal dimension values being a value of a second of the plurality of dimensions, wherein identifying the dominant dimension is based on comparing a number of abnormal metrics containing the first abnormal dimension value to a number of abnormal metrics containing the second abnormal dimension value.

12. An article comprising at least one non-transitory machine-readable storage medium storing instructions that upon execution cause a system to:
determine baseline values of metrics in a system;
identify abnormal metrics indicative of an anomaly based on the baseline values, where each of the abnormal metrics is associated with a common set of a plurality of dimensions;
identify selected dimension values of the abnormal metrics as being abnormal dimension values according to a predefined criterion, a first of the abnormal dimension values being a value of a first of the plurality of dimensions, and a second of the abnormal dimension values being a value of a second of the plurality of dimensions; and
identify a dominant dimension related to the anomaly based on the identified abnormal dimension values, the dominant dimension being associated with the anomaly and being one of the first and second dimensions.

13. The article of claim 12, wherein the dominant dimension and the abnormal dimension values are useable in determining a cause of the anomaly.

14. The article of claim 12, wherein the instructions upon execution cause the system to further:
identify a largest problem scope based on the identified abnormal dimension values.

15. The article of claim 14, wherein identifying the largest problem scope comprises identifying a dimension value that covers multiple ones of the abnormal dimension values.

16. The article of claim 15, wherein identifying the largest problem scope uses a hierarchical data structure having nodes representing respective dimension values, wherein the largest problem scope corresponds to a node that has children nodes corresponding to plural ones of the multiple abnormal dimension values.

17. The article of claim 12, wherein identifying the dominant dimension is based on comparing a number of abnormal metrics containing the first abnormal dimension value to a number of abnormal metrics containing the second abnormal dimension value.

18. A system comprising:
at least one processor to:
receive abnormal metrics indicating presence of an anomaly in the system, wherein each of the abnormal metrics is associated with a common set of a plurality of dimensions;
determine, based on values of the plurality of dimensions, a plurality of the values as being abnormal dimension values, a first of the abnormal dimension values being a value of a first of the plurality of dimensions, and a second of the abnormal dimension values being a value of a second of the plurality of dimensions; and
based on determining the abnormal dimension values, identify a dominant dimension that is associated with the anomaly, the dominant dimension being one of the first and second dimensions.

19. The system of claim 18, wherein the at least one processor is to further:
identify a largest problem scope based on the abnormal dimension values.

20. The system of claim 19, wherein the largest problem scope comprises a dimension value that covers multiple ones of the abnormal dimension values.

21. The system of claim 18, wherein identifying the dominant dimension is based on comparing a number of abnormal metrics containing the first abnormal dimension value to a number of abnormal metrics containing the second abnormal dimension value.

* * * * *

UNITED STATES PATENT AND TRADEMARK OFFICE
CERTIFICATE OF CORRECTION

| | | |
|---|---|---|
| PATENT NO. | : 8,924,797 B2 | Page 1 of 1 |
| APPLICATION NO. | : 13/447512 | |
| DATED | : December 30, 2014 | |
| INVENTOR(S) | : Ruth Bernstein et al. | |

It is certified that error appears in the above-identified patent and that said Letters Patent is hereby corrected as shown below:

Title Page, (73) Assignee should read (73) Assignee: HEWLETT-PACKARD DEVELOPMENT COMPANY, L.P.

Signed and Sealed this
Nineteenth Day of May, 2015

Michelle K. Lee
*Director of the United States Patent and Trademark Office*